A. H. Wright.
Elastic Coupling.
N⁰ 27,505.   Patented Mar. 13, 1860.

WITNESSES
Benj Morison
B. F. Shattuck

INVENTOR.
A H Wright

UNITED STATES PATENT OFFICE.

ALBERT H. WRIGHT, OF PHILADELPHIA, PENNSYLVANIA, ASSIGNOR TO HIMSELF, J. C. FULLER, AND B. J. WOODWARD, OF SAME PLACE.

ELASTIC CHAIN OR SURGE-SPRING FOR SHIPS' CABLES.

Specification of Letters Patent No. 27,505, dated March 13, 1860.

*To all whom it may concern:*

Be it known that I, ALBERT H. WRIGHT, of the city of Philadelphia, in the State of Pennsylvania, have invented a new and Improved Detachable Surge-Spring for Anchor-Cables of Ships; and I do hereby declare that the following is a full, clear, and exact description of the construction and operation of the same, reference being had to the annexed drawings, making a part of this specification, in which—

Figure 1:
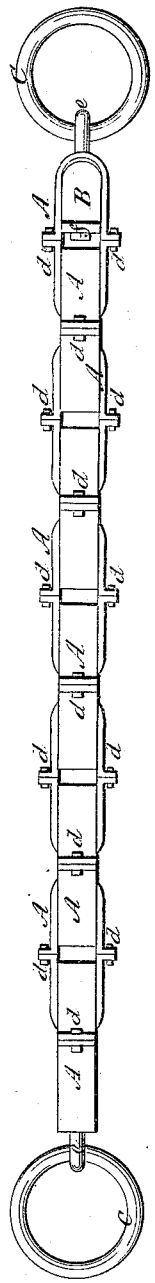
Figure 2:
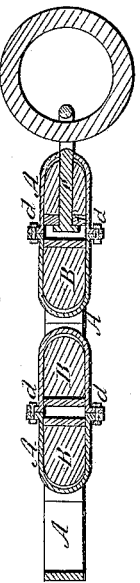

Figure 1, represents a side or top view of the said surge spring, ready for application; and Fig. 2 a longitudinal central section of one end of the same, like letters, when on both figures, indicating the same parts.

The nature of my invention consists in the arrangement and combination of blocks or layers of elastic-gum or india-rubber, with the links of a chain adapted for the purpose, as hereinafter described, whereby a more simple, light, durable, and effective apparatus is produced for easing the cable, or relieving it from the sudden rigid strains consequent upon the surging of the ship; and which can be readily attached to, and detached from, the said cable, as occasion may require.

In the drawings A—A represent the links of the said surge-spring; B—B, the blocks of elastic-gum, or india-rubber; and C, C, rings for the insertion of shackles whereby the said spring is to be attached to the anchor-cable.

The links (A) are each formed, of tough plate iron, in two parts attached firmly together by means of the rivets or bolts *d d*, the width of the iron of each link, being made slightly less than the space which is left between the two opposite inner sides of the link when formed, so as to admit of the said links being so interlocked with each other as to afford receptacles, for the gum-blocks, substantially as shown in the drawings.

The blocks of elastic-gum or india-rubber (B) are cut or shaped to fill the spaces or receptacles produced between the interlocking ends of the links (A) wherein they are securely held. The links may, if preferred, be connected together by means of nutted bolts, *e*, made to pass through appropriate holes to be made in the ends of the links (A) for the purpose, and through the blocks of elastic-gum (B), and sliding plates *f*, substantially in the manner indicated, in the drawings, whereby the end links of the spring are connected with the rings (C, C). The latter mode of connecting the links will allow each one of them to swivel independently of the others; but it is believed the first described mode is the better one for connecting the inner links, on account of its better preserving the strength of the gum blocks; while the latter mode is more appropriate when applied to the outer links to connect them with the rings (C, C), as shown—it affording a sufficient swiveling capacity in the spring to answer all necessary requirements of the kind.

The object, in constructing the links (A) in two parts, and bolting the said parts together as described, is to allow for the convenient insertion of the blocks of elastic-gum (B); but it is evident that, if only every other link, of the spring be so made, while the alternate links are formed into single-part links by welding, the gum blocks can be as readily inserted, and, consequently, that the cost of construction will, in so far, be diminished. It is also evident that, instead of making each of the rings (C, C) continuous, as shown, they may be made in the form or construction of a shackle, so as to admit of a direct junction with the links of the ship's cable, as hereinafter described.

In the application of this surge-spring after the anchor-cable has stopped running out, the ends of the surge-chain are to be attached, by shackles, to any two links, in the cable. situated sufficiently far enough apart to leave such a slack between them, in the said cable, as will not be taken up in the subsequent stretching of the spring during the surging of the ship, and consequently, so that the said spring shall form a "taut" medium of connection between the run-out portion of the cable and the windlass or capstan.

In the operation of this invention, the gum or rubber blocks (B—B) yield elastically to compression between the loop ends of the links (A—A), and also between the loop ends of the outer links and their plates (*f, f,*); and consequently the cable is "eased," or relieved from the sudden, rigid strains upon it, which would otherwise be consequent from the surging of the ship, in a most effective manner, by a simple apparatus which possesses the requisite lightness, durability, and applicability.

I am aware that a spiral, metal-spring and india-rubber disks, have been combined together in a cylinder so as to produce a detachable single spring; that spiral, metal-springs, in combination with air confined in a case by means of a piston so as to produce an elastic cushion therein, have also been used for the same, or similar purposes; and that a chain link has before been made, in two parts, bolted together. Therefore I do not claim, broadly, a surge spring consisting of india-rubber inclosed in a case; neither do I claim the modes herein described of constructing the links (A); but, having fully described my improved surge spring, and pointed out its superior utility,

What I claim as my invention and desire to secure by Letters Patent is—

The combined arrangement of the links (A), elastic blocks (B), and swivel bolts (e); the same operating together in the manner and for the purpose specified.

A. H. WRIGHT.

Witnesses:
BENJ. MORISON,
B. F. SHATTUCK.